United States Patent [19]

Deutschmann

[11] Patent Number: 4,457,134
[45] Date of Patent: Jul. 3, 1984

[54] TURBOCHARGE SYSTEM FOR INTERNAL COMBUSTION ENGINES

[75] Inventor: Herbert Deutschmann, Friedrichshafen, Fed. Rep. of Germany

[73] Assignee: MTU Motoren-und Turbinen-Union Friedrichshafen GmbH, Fed. Rep. of Germany

[21] Appl. No.: 289,988

[22] Filed: Aug. 4, 1981

[30] Foreign Application Priority Data

Aug. 9, 1980 [DE] Fed. Rep. of Germany ....... 3030265

[51] Int. Cl.$^3$ .............................................. F02B 37/00
[52] U.S. Cl. ......................................................... 60/612
[58] Field of Search ................................... 60/612, 602

[56] References Cited

U.S. PATENT DOCUMENTS

| | | | |
|---|---|---|---|
| 2,380,777 | 7/1945 | Moss ................................. | 60/612 X |
| 2,773,348 | 12/1956 | Grieshaber et al. ............. | 60/612 X |
| 4,228,655 | 10/1980 | Herschmann et al. ........... | 60/612 X |

FOREIGN PATENT DOCUMENTS

| | | | |
|---|---|---|---|
| 2809202 | 9/1979 | Fed. Rep. of Germany ........ | 60/612 |
| 2855551 | 7/1980 | Fed. Rep. of Germany ........ | 60/612 |
| 55-109726 | 8/1980 | Japan ..................................... | 60/612 |

*Primary Examiner*—Michael Koczo
*Attorney, Agent, or Firm*—Craig & Burns

[57] ABSTRACT

An internal combustion engine with several parallel-connected exhaust gas turbochargers which are adapted to be individually connected and disconnected. The exhaust gas turbochargers are constructed so that together they accommodate the exhaust gas and air mass throughflow of the internal combustion engine at rated power. At a partial power of the internal combustion engine, in correspondence with an instantaneous supply of exhaust gas, such a number of exhaust gas turbochargers are in operation that the internal combustion engine operates maximally close to optimum operating conditions. One of the exhaust gas turbochargers is constructed for a lower exhaust gas and air mass throughflow than the remaining exhaust gas turbochargers. The larger exhaust gas turbochargers are added in succession, corresponding to respective exhaust gas supplies in case of changes during operation of the internal combustion engine toward higher partial power and are disconnected in succession in case of changes toward lower partial power. The small exhaust gas turbocharger, in an operating range between lowest and highest exhaust gas supply of the internal combustion engine, is repeatedly added and repeatedly disconnected in supplementation to the large exhaust gas turbochargers.

7 Claims, 1 Drawing Figure

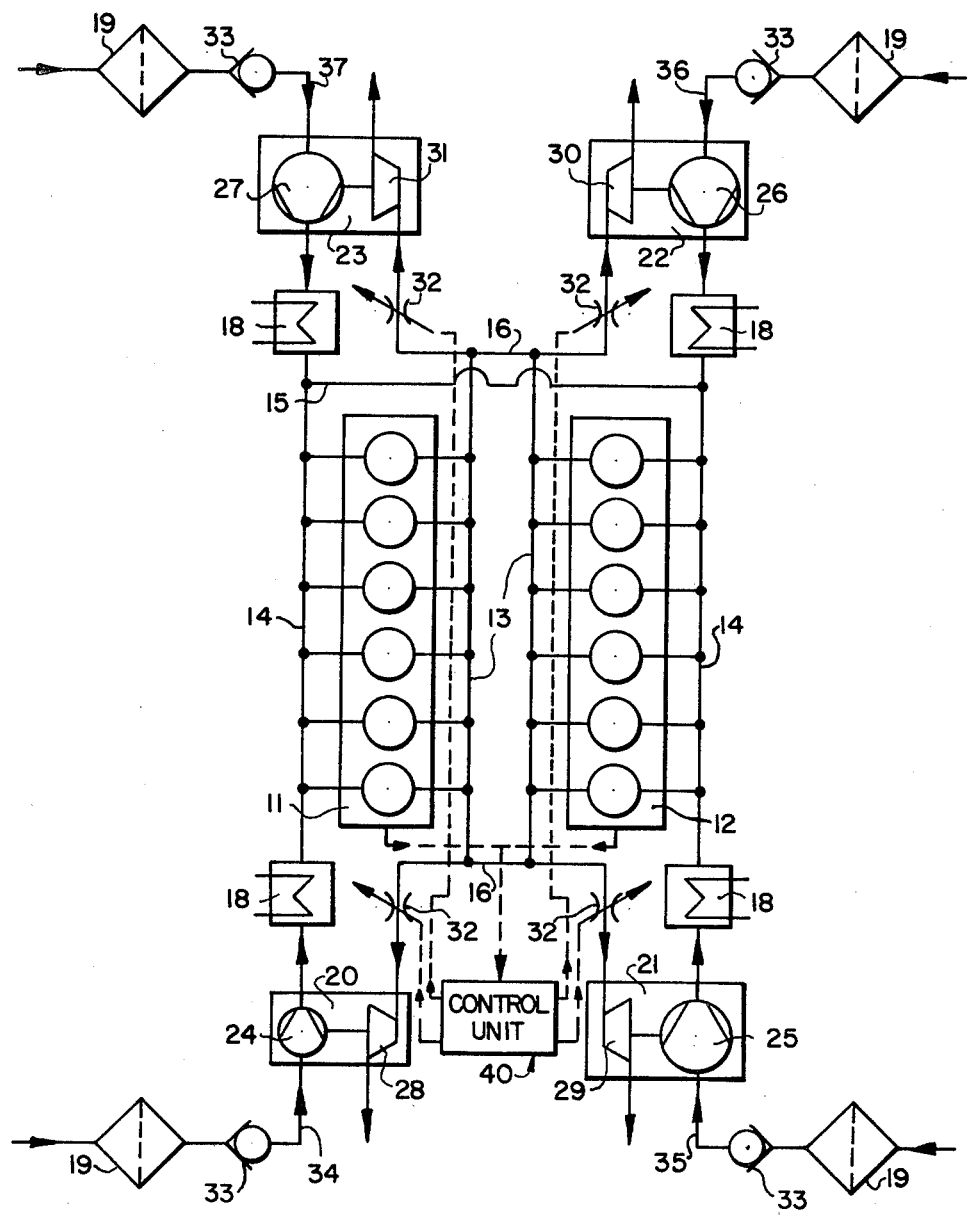

TURBOCHARGE SYSTEM FOR INTERNAL COMBUSTION ENGINES

The present invention relates to an internal combustion engine and, more particularly, to an internal combustion engine provided with several exhaust gas turbochargers connected in parallel which may be individually connected and disconnected and are constructed together for the exhaust gas and air mass throughflow of the internal combustion engine at rated load or power and in which, at a partial load or power of the internal combustion engine, so many of the exhaust gas turbochargers are in operation corresponding to the instantaneous supply of exhaust gas that the internal combustion engine operates as close as possible to optimum operating conditions.

In internal combustion engines of the aforementioned prior art type, a different number of the installed turbochargers is in operation in dependence upon the speed range so that the internal combustion engine operates, with such an arrangement, in each case at or close to an optimum point for fuel consumption. At the same time, the exhaust gas turbochargers are in operation at rotational speeds as well as air mass throughflows and exhaust gas mass throughflow which come close to their rated points.

A disadvantage of the prior art internal combustion engines of the aforementioned type resides in the fact that the number of possible optimum consumption points for the operation of the internal combustion engine corresponds to the number of exhaust gas turbochargers installed. For operating the internal combustion engine at a larger number of optimum consumption points, and increased number of exhaust gas turbochargers is required for the internal combustion engine; however, one or several additional exhaust gas turbochargers cause considerable added expenses, greater weight, increased structural volume, and an increase in expenditures required for servicing.

The aim underlying the present invention therefore resides in realizing for an internal combustion engine having a given number of exhaust gas turbochargers, and operation with a maximum number of optimum consumption points, thereby providing an optimum adaptation between the internal combustion engine and the exhaust gas turbochargers.

The underlying problems are solved in accordance with the present invention in that one of the exhaust gas turbochargers is designed for a lower exhaust gas and air mass throughflow than the remaining exhaust gas turbochargers which are identical among each other, in that the larger exhaust gas turbochargers are additionally engaged successively corresponding to a respective exhaust gas supply with changes during the operation of the internal combustion engine toward higher partial loads and are successively disengaged with changes toward lower partial loads, and in that the smaller exhaust gas turbocharger is repeatedly engaged and repeatedly disengaged to supplement the larger exhaust gas turbochargers within the operating range between smallest and largest exhaust gas supply of the internal combustion engine.

According to further features of the present invention, the jump in the step from one shifting step to the next between the engagement, respectively, disengagement of one large exhaust gas turbocharger and of the next large exhaust gas turbocharger is reduced by the engagement or disengagement of the small exhaust gas turbocharger.

According to the present invention, the engagement and disengagement of each of the exhaust gas turbochargers takes place by opening and closing of an exhaust gas valve associated with a respective exhaust gas turbocharger. The exhaust gas valves are controlled by conventional control means responsive to sensed operating conditions of the internal combustion engines reflecting the exhaust gas supply, such as, for example, the speed of the engine. However, instead of the speed of the engine, it is also possible to use other operating parameters of the internal combustion engine for the control of the engagement and disengagement of the exhaust gas turbochargers, such as, for example, the boost pressure, etc.

According to the present invention, the air and exhaust gas mass throughflow of the small exhaust gas turbocharger to the large exhaust gas turbocharger is at a ratio of approximately 1:2 to that of the large exhaust gas turbocharger.

The advantages attainable with the present invention reside, in particular, in that a lowering of the fuel consumption of the internal combustion engine is obtained, in that the acceleration characteristics of the internal combustion engine are improved and in that, as a result of increased average pressure, the internal combustion engine is able during partial load operation to provide a higher torque than possible heretofore.

Accordingly, it is an object of the present invention to provide an internal combustion engine equipped with several parallelly connected exhaust gas turbochargers which avoids, by simple means, the aforementioned shortcomings and disadvantages encountered in the prior art.

Another object of the present invention resides in providing an internal combustion engine equipped with several parallelly connected exhaust gas turbochargers which enables the attainment of an optimum adaptation between the internal combustion engine and the exhaust gas turbochargers.

Still another object of the present invention resides in providing an internal combustion engine equipped with several parallelly connected exhaust gas turbochargers which enables a lowering of the fuel consumption of the engine.

A still futher object of the present invention resides in providing an internal combustion engine with several parallelly connected exhaust gas turbochargers which functions reliably and efficiently under all operating loads of the internal combustion engine.

A still further object of the present invention resides in an internal combustion engine equipped with several parallelly connected exhaust gas turbochargers which exhibits improved acceleration characteristics.

A still further object of the present invention resides in providing an internal combustion engine equipped with several parallelly connected exhaust gas turbochargers which is simple in construction and therefore relatively inexpensive to manufacture.

These and other objects, features, and advantages of the present invention will become more apparent from the following description when taken in connection with the accompanying drawing which shows, for purposes of illustration only, one embodiment in accordance with the present invention, and wherein:

The single FIG. of the drawing is a schematic view of an internal combustion engine constructed in accordance with the present invention equipped with several parallelly connected exhaust gas turbocharger which may be individually connected and disconnected.

Referring now to the single FIG. of the drawing, according to this FIG., an internal combustion engine is equipped, for example, with four exhaust gas turbochargers 20, 21, 22, 23 which together are designed for the air and exhaust gas mass throughflow of the internal combustion engine at rated power or load. The four exhaust gas turbochargers 20, 21, 22, 23 are connected in parallel on the compressor output side and on the exhaust gas side and may be individually connected and disconnected, i.e., may be individually engaged and disengaged. Three of the exhaust gas turbochargers 21, 22, 23 are of identical construction, whereas the exhaust gas turbocharger 20 is designed for a smaller air and exhaust gas mass throughflow.

The internal combustion engine includes two cylinder rows 11, 12 which are respectively equipped with one exhaust gas manifold 13 and with one supercharging air line 14. The two supercharging air lines 14 are connected together by a line 15, while the two exhaust gas manifolds 13 are connected together by lines 16. The exhaust gas manifolds 13 lead to exhaust gas turbines 28, 29, 30, 31 of the four exhaust gas turbochargers 20, 21, 22, 23. The exhaust gas turbines 28, 29, 30, 31 drive compressors 24, 25, 26, 27 which suck in the supercharging air through intake air filters 19 and feed the same by way of supercharging air coolers 18 into the supercharging lines 14.

One adjustable exhaust gas valve 32 each is arranged between the exhaust gas manifolds 13 and the respective exhaust gas turbines 28, 29, 30, 31, by means of which the supply of exhaust gas to the exhaust gas turbines 28, 29, 30, 31 can be individually shut off.

One check valve 33 each is disposed in the respective intake lines 34, 35, 36, 37 of the compressors 24, 25, 26, 27. The check valves 33 permit an air flow in the intake lines 34, 35, 36, 37 in a direction toward the respective compressors 24, 25, 26, 27 but prevent such the air flow in an opposite direction. The check valves 33 may be constructed, for example, as a flap valve and be operated by the pressure in the respective intake line 34, 35, 36, 37. During starting up of the internal combustion engine and in all operating load ranges, in which only small amounts of exhaust gas are produced such as, for example, during idling and during low partial load operation, the exhaust gas valves 32 of the exhaust gas turbochargers 21, 22, 23 are closed, and the internal combustion engine is charged only by means of the exhaust gas turbocharger 20. Thus, at start up, supercharging air delivered by the compressor 24 flows into the supercharging air lines 14 and reaches by way of the remaining charging air intercoolers 18 and the vanes of the compressors 25, 26, 27 of the exhaust gas turbochargers 21, 22, 23 the check valves 33 which are closed by the supercharging air pressure and prevent an escape of the supercharging air so that the same pressure prevails upstream and downstream of the vanes of the compressors 25, 26, 27.

If the production of exhaust gases of the internal combustion engine increases with an increasing load and/or with an increasing rotational speed of the engine and finally exceeds the input capacity of the turbine 28 of the exhaust gas turbocharger 20, a second exhaust gas turbocharger, for example, the exhaust gas turbocharger 21 must be additionally engaged. This takes place in a simple manner by opening the associated exhaust gas valve 32. The exhaust gases from the engine which then flow through the turbine 29 can accelerate the exhaust gas turbocharger 21 in a very short period of time because the associated compressor 25 does not as yet supply any air and, accordingly, does not have to produce any feed work. Only when the compressor 25 is able by reason of its rotational speed to produce a supercharging air pressure which is higher than the then prevailing one, will the associated check valve 33 be opened by the vacuum in the intake line 35 thereby starting the supply of supercharging air. With the opening of the check valve 33 in the intake line 35, and additional engagement operation is completed. As can be readily appreciated, the disconnection or disengagement of an exhaust gas turbocharger takes place by a closing of the asscociated exhaust gas valve 32.

The mass of the air and exhaust gases flowing through each of the three large exhaust gas turbochargers 21, 22, 23 has a ratio, with respect to the small exhaust gas turbocharger 20, of approximately 2:1. Consequently, each of the large exhaust gas turbochargers 21, 22, 23 is constructed for 2/7, and the small exhaust gas turbocharger 20 is constructed for 1/7 of the throughflow of the air and exhaust gas mass of the internal combustion engine at the rated load or power.

For operating the internal combustion engine between idling and a maximum power, the following shifting sequence can be realized, for example, with the four exhaust gas turbochargers (referred to in the following chart as Exhaust Turbo Chargers -ETC-) 20, 21, 22, 23, with the aforementioned staggering in size:

|   | SMALL TC | FIRST LARGE TC | SECOND LARGE TC | THIRD LARGE TC |
|---|---|---|---|---|
| 1. | ▬▬▬ |   |   |   |
| 2. |   | ▬▬▬ |   |   |
| 3. | ▬▬▬ | ▬▬▬ |   |   |
| 4. |   | ▬▬▬ | ▬▬▬ |   |
| 5. | ▬▬▬ | ▬▬▬ | ▬▬▬ |   |
| 6. |   | ▬▬▬ | ▬▬▬ | ▬▬▬ |
| 7. | ▬▬▬ | ▬▬▬ | ▬▬▬ | ▬▬▬ |

As can be seen from the above table of shifting sequence, it is possible to achieve a seven-stage shifting sequence with the four exhaust gas turbochargers 20, 21, 22 23. The large exhaust gas turbochargers 21, 22, 23 are additionally engage in succession when there is an increase in the power requirement demanded by the internal combustion engine, and are disconnected or disengaged one after the other when the power requirement drops, while the small exhaust gas turbocharger 20 is additionally engaged and disengaged several times to reduce the step in the jump from one shifting step to the next, supplementing the large exhaust gas turbochargers 21, 22, 23, depending upon the direction of change in the power required for the internal combustion engine. In the above-noted subdivision of the air and exhaust gas mass throughflow among the installed exhaust gas turbochargers 20, 21, 22, 23, the stepwise jump from one shifting stage to the next is halved in the described example.

In operation, and referring to the above chart, the progressive stages of the multi-stage exhaust gas driven turbocharger arrangement of the instant invention begins with the engine at idle or low RPM. In this first stage, only the small exhaust turbocharger, i.e., small ETC, is operative. In the second stage, it can be seen that the small ETC is not included and that a first large exhaust turbocharger, i.e., first large ETC, is operative. As demand increases the turbocharger arrangement shifts to a third stage which includes the small ETC and the first large ETC. Thus, it should be appreciated that 3/7 of the turbocharger arrangement capability is available in the operation of the engine, i.e., 1/7 from the small ETC and 2/7 from the first large ETC. Again, as demand increases and the arrangement shifts to the fourth stage, it can be seen that the first large ETC and second large ETC are operative and that the small ETC is not included, i.e., 4/7 of the total capability is operative. The progression continues in this same pattern, i.e., stages five, six, and seven, until all four of the turbochargers are operative, giving the engine the maximum available output as needed.

Each shifting stage corresponds to a specific rotational speed range of the internal combustion engine, at which the operation is possible at or close to an optimum point for fuel consumption. Since, a number of exhaust gas turbochargers is in operation at partial load of the internal combustion engine which respectively corresponds to the instantaneous supply of the exhaust gases, the exhaust gas turbochargers also operate at optimum operating values close to their rated point.

The control of the exhaust gas valves 32 takes place by conventional means not forming part of the present invention and is therefore indicated only schematically in the drawing by the block 40 which contains the necessary control elements to convert the information from the engine as regards the exhaust gas supply to the proper shifting sequence of the exhaust gas valves 32. The control device 40 is thereby responsive to operating parameters of the engine, such as engine speed and others as known in the art. The control system itself may be of any known type, for example, as disclosed in my copending application Ser. No. 297,598, now U.S. Pat. No. 4,418,536.

While I have shown and described only one embodiment in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. An internal combustion engine having an intake and exhaust system and producing exhaust gases flowing through the exhaust system comprising a plurality of exhaust gas turbocharger means operatively connected in parallel in said intake and exhaust system and constructed so that together all of the turbocharger means are operable to accommodate an exhaust gas and air mass throughflow of the engine at rated power of the engine, said exhaust gas tubocharger means including a relatively smaller exhaust gas turbocharger means and relatively larger remaining exhaust gas turbocharger means, said relatively smaller exhaust gas turbocharger means being smaller than the relatively larger remaining exhaust gas turbocharger means and being operable to accommodate a smaller exhaust gas throughflow than the remaining exhaust gas turbocharger means, control means including means for selectively and successively connecting and disconnecting the remaining exhaust gas turbocharger means in stepwise jumps to and from the exhaust gas flow in the exhaust system of the engine corresponding to the prevailing supply of exhaust gases during a change in operation of the internal combustion engine, and means for repeatedly connecting and disconnecting the smaller exhaust gas turbocharger means to and from the exhaust gas flow in the exhaust system of the engine in an operating range between lowest and highest exhaust gas supply of the engine so as to supplement the remaining exhaust gas turbocharger means corresponding to the prevailing supply of exhaust gases during a change in operation of the internal combustion engine, the number of exhaust gas turbocharger means in operation at any time depending on the instantaneous supply of exhaust gases in the exhaust system so that the engine operates maximally close to optimum operating conditions and each stepwise jump from one stage of operation to the next stage of operation by the connection or disconnection of one of the remaining exhaust gas turbocharger means is reduced by the intervening connection and disconnection of the smaller exhaust gas turbocharger means.

2. An internal combustion engine according to claim 1, wherein said plurality of exhaust gas turbocharger means includes at least three exhaust gas turbocharger means.

3. An internal combustion engine according to one of claims 1, or 2, wherein the exhaust gas and air mass throughflow of the smaller exhaust gas turbocharger means relative to the remaining exhaust gas turbocharger means is approximately 1:2.

4. An internal combustion engine according to claim 3, wherein each of the remaining exhaust gas turbocharger means are of an identical construction.

5. A turbocharger system for an internal combustion engine having an intake and exhaust system and producing exhaust gases flowing through said exhaust system, comprising first turbocharger means and second turbocharger means connected in parallel in said intake and exhaust system, said second turbocharger means including a plurality of turbochargers, wherein each of the plurality is larger in size with greater exhaust gas and air mass throughflow capacity than said first turbocharger means and said turbocharger system is constructed so that together the first and second turbocharger means accommodate an exhaust gas and air mass throughflow of an engine at rated power of the engine, means for selectively connecting and disconnecting each of the plurality of turbochargers in succession to and from the exhaust gas throughflow of the engine in correspondence with a supply of exhaust gases in the exhaust system during a change of operation of the internal combustion engine, and means for repeatedly connecting and disconnecting the first turbocharger means to and from the exhaust gas throughflow of the engine in an operating range between smallest and largest exhaust gas supply in the exhaust system responsive to a prevailing supply of exhaust gases during a change in operation of the engine, wherein as the turbocharger system connects and disconnects each of the plurality of turbochargers in succession, the first turbocharger means is repeatedly connected and disconnected in the succession between each respective successive pair of turbochargers of said plurality of turbochargers so that the engine operates maximally close to optimum operating conditions.

6. A turbocharger system as set forth in claim 5, wherein each of the plurality of turbochargers are of an identical construction, and wherein the number of turbochargers of said plurality of the first turbocharger means in operation depends on an instantaneous supply of exhaust gases.

7. A turbocharger system as set forth in claim 6, wherein the exhaust gas and air mass throughflow capacity of the first turbocharger means relative to each of the turbochargers of said plurality is generally 1:2.

* * * * *